United States Patent [19]

Barber, Jr. et al.

[11] 4,212,413

[45] Jul. 15, 1980

[54] METHOD AND APPARATUS FOR DISPENSING FRIT HAVING A HYDRAULICALLY ACTUATED PISTON

[75] Inventors: Donald L. Barber, Jr., Corning, N.Y.; Bernard G. Caron, Lewisberry, Pa.

[73] Assignee: Corning Glass Works, Corning, N.Y.

[21] Appl. No.: 934,343

[22] Filed: Aug. 17, 1978

[51] Int. Cl.² ............................................. G01F 11/04
[52] U.S. Cl. ...................................... 222/1; 222/318; 222/334; 417/385
[58] Field of Search ................. 222/1, 130, 318, 334, 222/380, 390, 409; 417/383, 385, 388, 900; 128/234, 235; 27/24 R

[56] References Cited

U.S. PATENT DOCUMENTS

| 1,504,423 | 8/1924 | Boneberg | 222/334 X |
| 2,606,696 | 8/1952 | Miner | 222/334 |
| 3,180,527 | 4/1965 | Wasilewski et al. | 222/334 X |
| 3,208,638 | 9/1965 | Frenzel et al. | 222/390 X |
| 3,890,922 | 6/1975 | Nordenholt | 222/334 X |
| 3,984,033 | 10/1976 | Groth et al. | 222/390 X |

*Primary Examiner*—Robert J. Spar
*Assistant Examiner*—Fred A. Silverberg
*Attorney, Agent, or Firm*—Burton R. Turner; John P. DeLuca

[57] ABSTRACT

Frit material for sealing glass parts is dispensed to a sealing edge of one of such parts at a uniform desired rate through the utilization of controllably operated piston and cylinder mechanism providing constant volume displacement during the dispensing of such frit material.

7 Claims, 1 Drawing Figure

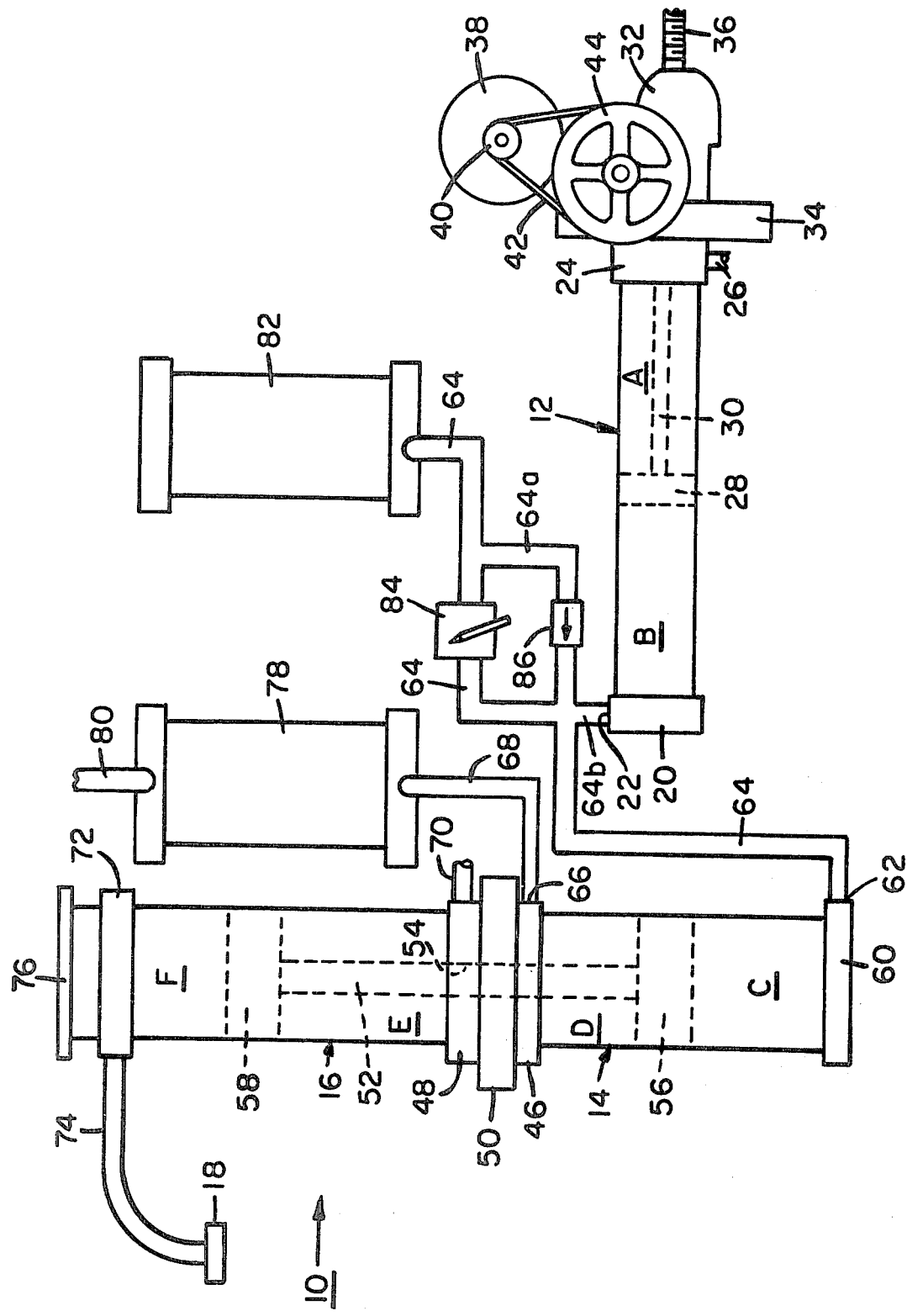

METHOD AND APPARATUS FOR DISPENSING FRIT HAVING A HYDRAULICALLY ACTUATED PISTON

BACKGROUND OF THE INVENTION

The present invention is in the field of ceramic sealing, and particularly relates to an improved method and apparatus for dispensing fritted solder glasses useful for sealing together glass or other ceramic parts.

Sealing glass compositions such as suspensions of fritted solder glasses are generally referred to in the industry as "frit" and are used in the fabrication of many different kinds of assemblies comprising ceramic parts, glass envelopes for electrical devices, glass-ceramic components for telescope mirror blanks, and ceramic substrates for electrical circuits. One major sealing application of frit is in the manufacture of cathode ray tube envelopes for television picture tubes and the like. Such envelopes are fabricated by sealing a funnel member and a face plate or panel member together through the utilization of a frit which is normally applied by extrusion in the shape of a continuous ribbon or bead on at least one of the mating or sealing surfaces provided on the panel and funnel. Such parts are then joined together and fired to provide an integral assembly wherein the frit provides a mechanically strong hermetically sealed joint.

In the past it has been customary to apply a bead of such frit material to the sealing edge of an article to be sealed by means of an up-right cylindrical type container having an orifice adjacent the bottom and a supply of the frit material to be dispensed retained therein under a constant pneumatic pressure. However, due to the fact that the frit retained within such cylinder changes viscosity with time and temperature and further in view of the fact that the head of the frit material varies as the frit is used up under pressure, the amount of frit layed down by such known dispensers tended to vary over a wide range, thus producing unacceptable seal strengths either due to a lack or an excess of frit material. Further, in order that the frit material will not run over the seal edge of the glass article and also to provide for a shaped cross-section with more frit on the inside which after firing results in a stronger seal, it is desirable to dispense a fairly high viscosity frit material with a shaped cross section. However, with conventional constant pressure dispensers, the necessary high viscosity frit materials could not be conveniently dispensed, since the required high pressures merely blew a hole through the center of the frit paste adjacent the dispensing orifice.

It thus has been a principal object of the present invention to provide method and apparatus for dispensing a uniform amount of frit for sealing glass articles, independently of its temperature or viscosity, by utilizing a controlled constant volume displacement.

SUMMARY OF THE INVENTION

In its very simplest form, the present invention relates to a method of and apparatus for dispensing frit material, for sealing glass articles together, in a controlled uniform manner so as to provide improved sealing characteristics. When a nonuniform bead of frit material is dispensed on a sealing edge, a hermetic seal may not be obtainable in those areas where insufficient frit material was layed down, and an unsightly protrusion and stress riser of glass results in those areas where excess frit material is deposited upon the sealing surface.

A basic method of accomplishing the present invention is to fill a cylinder with frit material to be dispensed while retracting the piston within such cylinder, and then extruding such material through an orifice connected to such cylinder by controllably moving the piston forwardly so as to provide a constant volume displacement, thus dispensing a consistent amount of frit over time and with a desired configuration. In order to obtain more precise control and faster reload times, however, it is desirable to utilize a plurality of interconnected pistons and cylinders which provide constant volume displacement at a desired controlled rate.

DESCRIPTION OF THE DRAWING

The FIGURE is a schematic illustration of a preferred embodiment for dispensing frit material at a controlled rate and desired configuration by means of constant volume displacement.

DESCRIPTION OF THE PREFERRED EMBODIMENTS

Referring now to the drawing, a dispensing system is shown including a control cylinder 12, an operating cylinder 14, a dispensing cylinder 16 and a frit dispensing orifice 18. The control cylinder 12 has a closed forward end cap 20 having an opening 22 connected to a series of hydraulic lines, and a closed rearward end cap 24 having an opening 26 to the atmosphere. The cylinder 12 has a conventional piston 28 movable therein between the forward and rearward end caps by means of a piston rod 30 which in turn is actuated longitudinally by means of a screw feed jack, such as a Duff-Norton M2805-20 ball screw actuator 32 mounted upon a suitable support 34 attached to end cap 24. As shown, the rearward portion of the piston rod 30 may be threaded as at 36 so as to be actuated longitudinally by jack 32, or alternatively the piston rod 30 may be axially secured to the threaded portion 36 of the screw jack. A variably controlled DC motor 38, also mounted on said support 34, has a pulley 40 mounted on an output shaft thereof which, through belt 42, drives pulley 44 mounted upon an input shaft of the screw jack 32. Thus, the speed and direction in which piston 28 moves in cylinder 12 is determined by the operation of variable speed motor 38 which, through the screw jack 32 translates rotational movement of pulleys 40 and 44 into longitudinal movement of the piston 28 by means of rod 30.

The operating cylinder 14 and the dispensing cylinder 16 are axially aligned with the forward end cap 46 of operating cylinder 14 joined with the rearward end cap 48 of dispensing cylinder 16 by means of a suitable spacer or support member 50. A common piston rod 52 for both cylinders 14 and 16 slideably extends in a sealing relation through an axially aligned opening 54 formed in members 46, 48 and 50. Piston 56 is formed on the end of rod 52 which terminates in cylinder 14, whereas piston 58 is formed on the end of rod 52 which terminates in cylinder 16. An end cap 60 is formed on the rearward end of operating cylinder 14 and has an opening 62 communicating with hydraulic conduit 64, whereas forward end cap 46 has an opening 66 communicating with hydraulic conduit 68. Rearward end cap 48 of dispensing cylinder 16 has an opening 70 which is vented to the atmosphere. The forward end cap 72 of dispensing cylinder 16 is in fact hollow and has an outlet conduit 74 connected thereto which communicates with discharge orifice 18. A charging cover 76 is positioned upon forward end cap 72, and the dual cylinder assembly including the cover and end caps are all suitably retained together such as by a plurality of tie rods and bolts.

Hydraulic conduit 68 communicates with a lower end of a hydraulic supply container or reservoir tank 78 having an upper conduit 80 communicating with a source of air under pressure, whereas conduit 64 also communicates with the lower end of a second hydraulic supply or reservoir tank 82. A two-way valve 84 is positioned within conduit 64 between rearward end cap 60 and reservoir tank 82. A bypass conduit 64a, having a preset check valve 86 therein, bypasses the two-way valve 84 positioned in line 64 so as to provide a safety release mechanism should unwarranted pressures inadvertently be obtained. As shown, a conduit 64b communicates with the opening 22 of end cap 20 and conduits 64 and 64a.

As will be apparent from the foregoing description, chamber A between rear end plate 24 and piston 28 of control cylinder 12 is vented to the atmosphere, whereas chamber B between forward end plate 20 and piston 28 is filled with an hydraulic fluid such as oil. Chamber C between rear end plate 60 and piston 56 of operating cylinder 14 is also supplied with a suitable hydraulic fluid such as oil, as is chamber D between forward end plate 46 and piston 56. Chamber E, between rearward end plate 48 and piston 58 of dispensing cylinder 16 is vented to the atmosphere, whereas chamber F between charging cover 76 and piston 58 is filled with frit material to be dispensed by orifice 18.

In operation, with piston 28 of cylinder 12 and pistons 56 and 58 of cylinders 14 and 16 respectively in their rearward or retracted positions, and with chamber F charged with frit material to be dispensed, valve 84 is closed and variable speed DC motor 38 is operated at a preselected speed for dispensing the frit material at a desired rate. Screw feed jack 32, operated by belt 42 about pulleys 40 and 44, translates the rotational movement of motor 38 into linear longitudinal motion by driving piston rod 30 and piston 28 forwardly in control cylinder 12 at a constant rate. The forward motion of piston 28 produces a constant volume displacement of the oil in chamber B to chamber C by means of opening 22, conduits 64b and 64 and opening 62, with the oil being displaced at a constant rate from chamber B into chamber C. The oil entering chamber C displaces piston 56 of operating cylinder 14 forwardly which in turn displaces piston 58 of dispensing cylinder 16 forwardly, since they are connected by common piston rod 52, and accordingly frit material is dispensed through conduit 74 to dispensing orifice 18 at the same constant volume displacement from chamber F as that produced by the transfer of oil from chamber B to chamber C, and at the desired constant rate produced by variable speed motor 38. As piston 56 is moved forwardly in operating cylinder 14, the oil in chamber D is displaced through opening 66 and conduit 68 into reservoir tank 78. The motor 38 may be operated continuously if desired until all of the frit material in chamber F has been dispensed, however, it is usually preferable to operate the motor intermittently for timed periods so as to lay down a bead of frit material about the sealing edge of articles successively presented to the dispensing orifice 18.

To recharge the supply of frit material to chamber F, two-way valve 84 is moved to the open position, charging cover 76 is removed from dispensing cylinder 16, pressurized air is supplied to reservoir 78 by conduit 80 and the direction of motor 38 is reversed to reverse the drive of piston 28 and piston rod 30 in control cylinder 12. As pressurized air, which may be approximately 100 psi, is supplied to reservoir tank 78, the oil stored therein as previously supplied from chamber D is forced outwardly through conduit 68 and opening 66 back into chamber D so as to retract and move piston 56 toward the rearward end of operating cylinder 14, which simultaneously through common piston rod 52 retracts piston 58 in dispensing cylinder 16 moving it toward the rearward end thereof. Simultaneously, the oil in chamber C is displaced through opening 62, conduit 64 and valve 84 into reservoir tank 82, and as piston 28 is retracted such oil also flows within chamber B of control cylinder 12. However, the movement of pistons 56 and 58, due to the pressurized oil from tank 78, is much more responsive and faster acting than the mechanical retraction of piston 28 through screw jack 32 and motor 38, and accordingly reservoir tank 82 is necessary in order to accommodate the oil displaced from chamber C while piston 28 is being retracted.

Frit material is then loaded into chamber F through the opening provided by the removal of charging cover 76, and the cover is then resecured to dispensing cylinder 16. The pressurized air is then disconnected by suitable valve means from reservoir tank 78 and two-way valve 84 is closed, preferably after the full retraction of piston 28, although check valve 86 permits oil from reservoir tank 82 to be supplied to chamber B via conduit 64a, should valve 84 be closed prior to the full retraction of piston 28. As previously noted, both chambers A and E are vented to the atmosphere by means of openings 26 and 70 respectively, so as not to create either pressure or vacuum, therein during the movement of pistons 28 and 58.

Although not as responsive as the entire system 10 and requiring extended reload times, as a further embodiment of the invention, cylinder 12 together with jack screw 32 and motor 38 may be utilized as a dispensing unit in itself by directly connecting opening 22 in end cap 20 alternately to discharge orifice 18 and a supply of frit material, by suitable valve means. Thus, when opening 22 is connected directly to discharge orifice 18, motor 38 and jack screw 32 may be operated to move piston 28 through piston rod 30 at a constant rate to discharge frit material from chamber B through the orifice 18. Upon switching the valve to the source of frit material, the motor 38 and jack screw 32 may be reversed so as to reverse the movement of piston 28 and draw in a new supply of frit material through opening 22, and the dispensing process repeated, which for any given dispensing speed as set by the variable DC motor 38, will dispense a constant amount of frit through orifice 18.

However, by utilizing a plurality of cylinders as shown in dispensing system 10, better overall control can be obtained due to the fact that the diameter of the various cylinders may differ. That is, the diameter of dispensing cylinder 16 may be larger than the diameter of operating cylinder 14, which in turn may be larger than the diameter of control cylinder 12, such that more precise volume control may be obtained. Also, by varying the speed of the DC motor 38, the speed of the piston 28 may be varied to provide a broad range of dispensing rates which may range over a factor of 10. Further, since the piston 58 in dispensing cylinder 16 is retracted rearwardly at a rapid rate through the action of the pressurized oil from reserve tank 78 operating on piston 56 of operating cylinder 14, not only is it possible to rapidly reload chamber F of the dispensing cylinder 16 with frit material and recap the cylinder while the screw operated piston rod 30 of control cylinder 12 is still retracting piston 28, but also since the oil which operates dispensing piston 58 is confined within operating cylinder 14, there is no contamination of frit dispensing cylinder 16 with oil, since chamber E behind piston 58 is merely vented to the atmosphere.

Thus, the present invention which dispenses frit material at a constant rate with a constant volume displacement overcomes the problems of the prior art frit dispensing devices wherein a constant air pressure was applied to the frit material resulting in a variable dispensing rate due to changes in viscosity of the frit material being dispensed with time and temperature. In addition, such prior art devices could not extrude a shaped bead of frit material since in order for such material to retain its shaped form, it was necessary for the material to have a substantially high viscosity, and when higher pressures were utilized to dispense such high viscosity frit material, it resulted in a hole being blown through the frit material to the orifice. However, with the present invention it is possible to extrude shaped beads of relatively high viscosity frit material at a constant rate.

Although the now preferred embodiments of the invention have been disclosed together with their advantages, it will be apparent to those skilled in the art that other advantages may be obtained and that various changes and modifications may be made to the invention without departing from the spirit and scope thereof as defined in the appended claims.

We claim:

1. A method of dispensing frit material at a constant rate for sealing glass articles which comprises, supplying frit material to be dispensed into one end of a first cylinder, slideably mounting a piston within said cylinder with a piston rod attached thereto extending through the opposite end of said cylinder for sliding movement with respect to said opposite end, applying a motivating force to said piston rod externally of said cylinder for longitudinal movement within said cylinder toward and away from said one end, moving said piston rod and said piston within said cylinder toward said one end at a predetermined constant rate in response to said external motivation, dispensing frit material from said one end at a constant rate, continuously venting said cylinder to the atmosphere between said piston and said opposite end, and motivating said piston rod by selectively applying hydraulic fluid to one surface or to an opposite surface of a second piston attached to that portion of said piston rod extending through said opposite end of said cylinder.

2. A method of dispensing frit material as defined in claim 1 including the steps of driving a piston within a third cylinder at a predetermined constant rate toward an outlet end, dispensing hydraulic fluid from said outlet end of said third cylinder into one end of a second cylinder for moving said second piston within said second cylinder at a constant rate toward said opposite end of said first cylinder such that the volume of fluid dispensed from said third cylinder is constant with the volume of fluid supplied to said second cylinder for displacing said second piston therein, and simultaneously with the displacement of said second piston in said second cylinder moving said piston rod to displace said piston within said frit containing first cylinder toward said one end and dispensing frit material therefrom at a constant rate.

3. A method of dispensing frit material as defined in claim 2 including the steps of rapidly retracting said piston in said first cylinder toward said opposite end independently of the retraction of said piston within said third cylinder by applying hydraulic fluid to the opposite surface of said second piston while simultaneously venting the fluid previously supplied to said one end thereof to a hydraulic fluid reservoir.

4. Apparatus for dispensing frit material at a constant rate for sealing glass articles which comprises, first and second cylinder means having first and second pistons respectively slideably mounted therein, said first and second cylinder means being axially aligned and having adjacent end portions, a common piston rod slideably extending through an opening in said adjacent end portions and connecting said first and second pistons together, cover means removably connected to one end of said first cylinder means furthest from said second cylinder means for supplying frit material to said first cylinder means, means for supplying hydraulic fluid to one end of said second cylinder means adjacent said first cylinder means and to an opposite end of said second cylinder means furthest from said first cylinder means, third cylinder means having piston and rod means slideably extending through a rearward end of said third cylinder, electric motor actuated means externally of said third cylinder means for longitudinally moving said piston and rod means within said third cylinder means at a constant rate, and means for operatively connecting said third cylinder means with at least one of said first and second cylinder means such that movement of said common piston rod and said piston and rod means are interrelated in at least one direction.

5. Apparatus for dispensing frit material as defined in claim 4 wherein said means for supplying hydraulic fluid includes a first supply of hydraulic fluid communicating with said one end of said second cylinder means adjacent said first cylinder means, and conduit means communicating between a second supply of hydraulic fluid and the opposite end of said second cylinder means furthest from said first cylinder means and a forward end of said third cylinder means; and said electric motor actuated means actuating said piston and rod means for displacing hydraulic fluid from the forward end of said third cylinder means through said conduit means into said opposite end of said second cylinder means furthest from said first cylinder means and thereby actuate said second piston, said common piston rod, and said first piston to dispense frit material from said first cylinder means at a constant rate.

6. Apparatus for dispensing frit material as defined in claim 5 including means for pressurizing said first supply of hydraulic fluid and for rapidly retracting said second and first pistons to facilitate rapid reloading of said first cylinder means with frit material while said electric motor actuated means retracts said piston and rod means.

7. Apparatus for dispensing frit material as defined in claim 6 including valve means within said conduit means between said second supply of hydraulic fluid and the opposite end of said second cylinder means furthest from said first cylinder means for blocking the flow of hydraulic fluid to said second supply upon the forward actuation of said third piston within said third cylinder means, and for venting the hydraulic fluid from the opposite end of said second cylinder means furthest from said first cylinder means upon the application of pressure to said first supply.

* * * * *